(12) United States Patent
Chen et al.

(10) Patent No.: US 9,780,615 B2
(45) Date of Patent: Oct. 3, 2017

(54) MOTOR WINDING STRUCTURE

(71) Applicant: Sunonwealth Electric Machine Industry Co., Ltd., Kaohsiung (TW)

(72) Inventors: Guan-Ming Chen, Kaohsiung (TW); Chang-Yu Lin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 308 days.

(21) Appl. No.: 14/749,803

(22) Filed: Jun. 25, 2015

(65) Prior Publication Data

US 2016/0218577 A1   Jul. 28, 2016

(30) Foreign Application Priority Data

Jan. 27, 2015  (TW) .............................. 104102731 A

(51) Int. Cl.
*H02K 3/26*  (2006.01)
(52) U.S. Cl.
CPC ..................... *H02K 3/26* (2013.01)
(58) Field of Classification Search
CPC ... H02K 2203/03; H02K 3/26; H02K 2211/03
See application file for complete search history.

(56) References Cited

U.S. PATENT DOCUMENTS

| | | | | |
|---|---|---|---|---|
| 4,340,833 A | * | 7/1982 | Sudo | .......................... H02K 3/26 310/207 |
| 6,005,324 A | * | 12/1999 | Kim | ........................ H02K 21/24 310/179 |
| 2009/0152973 A1 | | 6/2009 | Horng et al. | |
| 2013/0049500 A1 | * | 2/2013 | Shan | .......................... H02K 3/26 310/71 |

FOREIGN PATENT DOCUMENTS

| | | | | |
|---|---|---|---|---|
| CN | 203119643 U | 8/2013 | | |
| DE | 3716625 A1 | * 12/1987 | ............... | H02K 3/26 |
| TW | 200929804 A | 7/2009 | | |
| TW | I384723 B | 2/2013 | | |
| TW | 201328128 A | 7/2013 | | |

* cited by examiner

*Primary Examiner* — Mohamad Musleh
(74) *Attorney, Agent, or Firm* — Alan D. Kamrath; Kamrath IP Lawfirm, P.A.

(57) ABSTRACT

A motor winding structure includes a base plate is disclosed. The base plate includes a board having a winding unit. The winding unit includes a plurality of coils formed on the surface of the board by electroforming or layout. Each coil has a center, and includes an inner end adjacent to the center and an outer end distant to the center. Two adjacent coils are connected to each other via the inner ends. The winding unit further includes an insulating layer and a conducting layer. The inner ends of the two coils are connected to an electrical connection pad. The insulating layer is arranged on the board. The two adjacent coils are covered by the insulating layer. The conducting layer extends through the insulating layer and is connected to the electrical connection pads of the two coils. The two coils are connected to each other via the inner ends.

21 Claims, 11 Drawing Sheets

MOTOR WINDING STRUCTURE

BACKGROUND OF THE INVENTION

1. Field of the Invention

The present invention generally relates to a motor winding structure and, more particularly, to a motor winding structure that allows a plurality of coils thereof to be electrically connected together without having to arrange any conducting hole on the base plate of the motor winding structure.

2. Description of the Related Art

FIG. 1 shows a conventional motor 8 including a base plate 81, a winding assembly 82 and a rotor 83. The winding assembly 82 is coupled with the base plate 81, and the rotor 83 is rotatably coupled with the base plate 81. The winding assembly 82 includes a board 821 and a plurality of coils 822 arranged on the board 821. The plurality of coils 822 is arranged on the board 821 by electroforming or layout. In this arrangement, the plurality of coils 822 is magnetically linked with the rotor 83, driving the rotor 83 to rotate. Such a motor can be seen in Taiwan Patent No. 1384723.

In the motor 8, the plurality of coils 822 must be electrically connected to each other. Specifically, each coil 822 has a center "C" and includes two ends. Each coil 822 is formed on the board 821 and extends in a clockwise or counterclockwise manner. One of the two ends of the coil 822 is adjacent to the center "C," and another end of the coil 822 is away from the center "C." Since the coil 822 is formed on the board 821 by layout, the end of the coil 822 adjacent to the center "C" (innermost part of the coil 822) cannot extend across the loops of the coil 822 to connect to the other coil 822 or an external power. In light of this, it is required to arrange a conducting hole that extends through the board 821 at the center "C" of the coil 822. Then, a conducting element such as a copper post, a conducting wire or a conducting layer is disposed in the conducting hole, such that the innermost part of the coil 822 can be connected to the other coil 822 or the external power via the conducting element. Alternatively, the innermost parts of the plurality of coils 822 can also be connected to each other via a jumper or jumpers.

However, arrangement of the conducting hole and the conducting element increases the manufacturing cost and structural complexity of the motor 8. Although the jumpers are used to connect the plurality of coils 822 together, the production of the motor 8 is difficult in order to prevent the jumpers from making contact with the electronic components of the board 821. Furthermore, arrangement of the jumpers increases the thickness of the board 821, which is against the purpose of miniaturization as required by the motor 8.

FIG. 2 shows another conventional motor winding structure 9 including a flexible base plate 91 and a winding assembly 92. The flexible base plate 91 includes a plurality of boards 911 and a plurality of bridges 912. Each bridge 912 is connected between two adjacent boards 911. The winding assembly 92 includes a plurality of winding units 921. Each winding unit 921 is arranged on a respective board 911. A conducting path 922 is arranged on the bridge 912 and connected between two winding units 921. As such, the flexible base plate 91 may be folded to stack the boards 911 together, forming a multiple-layered winding structure of a motor. This simplifies the assembly procedure of the motor and increases the number of turns of the windings. Such a motor winding structure 9 may be seen in Taiwan Patent No. 1422123. The motor winding structure 9 may be arranged in any motor. The winding units 921 may be electrified to drive a rotor of the motor to rotate.

The winding assembly 92 of the motor winding structure 9 has similar problems as the winding assembly 82 of the motor 8. Specifically, in addition to the conducting path 922 connected between two adjacent winding units 921, it is also required to form a conducting hole on each board 911 in order to electrically connect the winding units 921 of the boards 911 together. Thus, the winding units 921 of the boards 911 can form the required serial or parallel connection structures or the combination thereof. More specifically, the winding unit 921 on each of the boards 911 may comprise a plurality of coils 921a each having a center "C" and two ends. Each coil 921a is arranged on the board 911 and extends in a clockwise or countclockwise manner. One of the two ends of the coil 921a is adjacent to the center "C," and another end of the coil 921a is away from the center "C." Since the coil 921a and the conducting path 922 are formed on the board 911 by layout, the conducting path 922 is unable to extend across the coil 921a to electrically connect to the end of the coil 921a adjacent to the center "C" (innermost part of the coil 921a). In this regard, the conducting path 922 can only be connected to the end of the coil 921a away from the center "C" (outermost part of the coil 921a). In light of the defect, it is required to form a conducting hole that extends through the board 911 at the center "C" of the coil 921a. Then, a conducting element such as a copper post, a conducting wire or a conducting layer is disposed in the conducting hole, such that after the flexible base plate 91 is folded, the innermost parts of the coils 921a can be connected to each other via the conducting element.

However, arrangement of the conducting hole and the conducting element increases the manufacturing cost and structural complexity of the motor winding structure 9. In addition, as compared with the single board 821 of the motor 8, the motor winding structure 9 includes plural boards 911. In this regard, after the flexible base plate 91 is folded, short circuit can occur between the winding units 921 of the adjacent boards 911 since electricity can be conducted at both sides of the board 911 via the conducting element inside the conducting hole. Thus, an insulation treatment has to be provided between the adjacent boards 911 (such as the arrangement of an insulating layer between the adjacent boards 911). However, the insulation treatment makes the production of the motor winding structure 9 inconvenient and may increase the thickness of the motor winding structure 9.

In light of this, it is necessary to provide a novel motor winding structure free of the above problems of the conventional motor winding assembly 82 and the winding structure 9 caused by the arrangement of the conducting holes on the boards 821 and 911, such as high cost, complex structure and inconvenient production procedure.

SUMMARY OF THE INVENTION

It is therefore the objective of this invention to provide a motor winding structure that allows a plurality of winding units 2 thereof to be electrically connected together without having to arrange any conducting hole on the boards of the base plate of the motor winding structure.

In an embodiment, a motor winding structure including a base plate is disclosed. The base plate includes a board having a winding unit. The winding unit includes a plurality of coils formed on a surface of the board by electroforming or layout. Each of the plurality of coils has a center. Each of the plurality of coils includes an inner end adjacent to the center thereof, as well as an outer end distant to the center thereof. Two adjacent coils of the winding unit are connected to each other via the inner ends thereof. The winding unit further includes an insulating layer and a conducting layer. The inner end of each of the two adjacent coils is connected to an electrical connection pad. The insulating layer is arranged on the surface of the board. The two adjacent coils are covered by the insulating layer. The conducting layer extends through the insulating layer and is electrically connected to the electrical connection pads of the two adjacent coils. The two adjacent coils are electrically connected to each other via the inner ends thereof.

In a form shown, the insulating layer is formed by silicon dioxide, an insulating photoresist or a solder mask. The conducting layer is in a form of a metal formed on the insulating layer. The insulating layer is etched to form two recesses at the centers of the two adjacent coils. The conducting layer is filled in the recesses of the insulating layer and is electrically connected to the electrical connection pads of the two adjacent coils.

In another embodiment, a motor winding structure including a base plate is disclosed. The base plate includes a plurality of boards having a first board to an $n^{th}$ board connected in sequence. Each of the plurality of boards has a winding unit. The winding unit includes a plurality of coils formed on a surface of the board by electroforming or layout. Each of the plurality of coils has a center. Each of the plurality of coils includes an inner end adjacent to the center thereof, as well as an outer end distant to the center thereof. Two adjacent coils of the winding unit are connected to each other via the inner ends thereof. The winding unit further includes an insulating layer and a conducting layer. The inner end of each of the two adjacent coils is connected to an electrical connection pad. The insulating layer is arranged on the surface of the board. The two adjacent coils are covered by the insulating layer. The conducting layer extends through the insulating layer and is electrically connected to the electrical connection pads of the two adjacent coils. The two adjacent coils are electrically connected to each other via the inner ends thereof.

In a form shown, the base plate is foldable.

In the form shown, a bridge is formed between two adjacent boards. The winding units of the plurality of boards are connected to each other via a plurality of conducting wires, and the plurality of conducting wires is arranged on the base plate and extends through the plurality of boards and the bridges.

In the form shown, the plurality of conducting wires comprises a first conducting wire and a second conducting wire. The plurality of coils of each of the plurality of boards comprises a first outer coil and a second outer coil connected in series. The first and second outer coils of one of the plurality of boards are connected to the first and second conducting wires, respectively.

In the form shown, the plurality of coils of the winding unit further includes at least one inner coil connected between the first and second outer coils. The first and second outer coils and the at least one inner coil are connected to each other in series and are circumferentially arranged on the surface of the board.

In the form shown, the winding units of the plurality of boards are connected to each other in series.

In the form shown, the winding units of the two adjacent boards are connected to each other via the first or second conducting wire. The first or second conducting wire that is connected between the winding units of the two adjacent boards includes an end electrically connected to the first outer coil of one of the winding units, as well as another end electrically connected to the second outer coil of another one of the winding units.

In the form shown, the first and second conducting wires are connected to the first and $n^{th}$ boards, respectively. The plurality of conducting wires further includes a third conducting wire connected to the first board only. The first and third conducting wires are used as power input terminals, and the power input terminals are adapted to be connected to a driving circuit.

In the form shown, the plurality of boards includes first and second boards. The plurality of coils of the first board further includes two serial-connected coils. The first outer coil of the first board is electrically connected to the second outer coil of the second board via the first conducting wire. One of the two serial-connected coils of the first board is electrically connected to the first outer coil of the second board via the second conducting wires. The plurality of conducting wires further comprises a third conducting wire connected to the second outer coil of the first board, as well as a fourth conducting wire connected to another one of the two serial-connected coils of the first board.

In the form shown, the third and fourth conducting wires are used as two power input terminals that are adapted to be connected to a driving circuit.

In the form shown, the winding units of the plurality of boards are connected in parallel.

In the form shown, the first conducting wire is connected to the first outer coils of the plurality of boards and is used as a power input terminal. The second conducting wire is connected to the second outer coils of the plurality of boards and is used as another power input terminal. The two power input terminals are adapted to be connected to first and second electrical wires of a driving circuit, respectively.

In the form shown, each of the plurality of conducting wires has a part that is located on the bridge, and said part of the conducting wire is connected to an auxiliary conducing wire in parallel.

In the form shown, said part of the conducting wire or the auxiliary conducing wire has a diameter larger than another part of the conducting wire located on the board.

In the form shown, an assembly hole is arranged at a center of each of the plurality of boards.

In the form shown, each of the plurality of boards includes a first face and a second face opposite to the first face, and the winding units is arranged on the first face.

In the form shown, the base plate is folded at the bridges in a manner that each of the plurality of boards other than the first board is folded towards the second face of an adjacent one of the plurality of boards.

In the form shown, the base plate further includes a driving circuit portion electrically connected to the plurality of boards.

In a further embodiment, a motor winding structure including a foldable base plate is disclosed. The foldable base plate includes a plurality of board units. Each of the plurality of board units includes the plurality of boards as defined above. The winding units in each of the plurality of board units are electrically connected in series, and the plurality of board units is electrically connected to each other in parallel.

In each of the motor winding structures above, two circumferentially adjacent coils may be electrically connected to each other via the centers of said coils. Therefore, after the base plate is folded, all of the coils of the winding unit may be electrically connected to each other without having to arrange any conducting hole on the boards.

Advantageously, the production cost and structural complexity of the motor winding structure can be lowered and the manufacturing process can be simplified.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
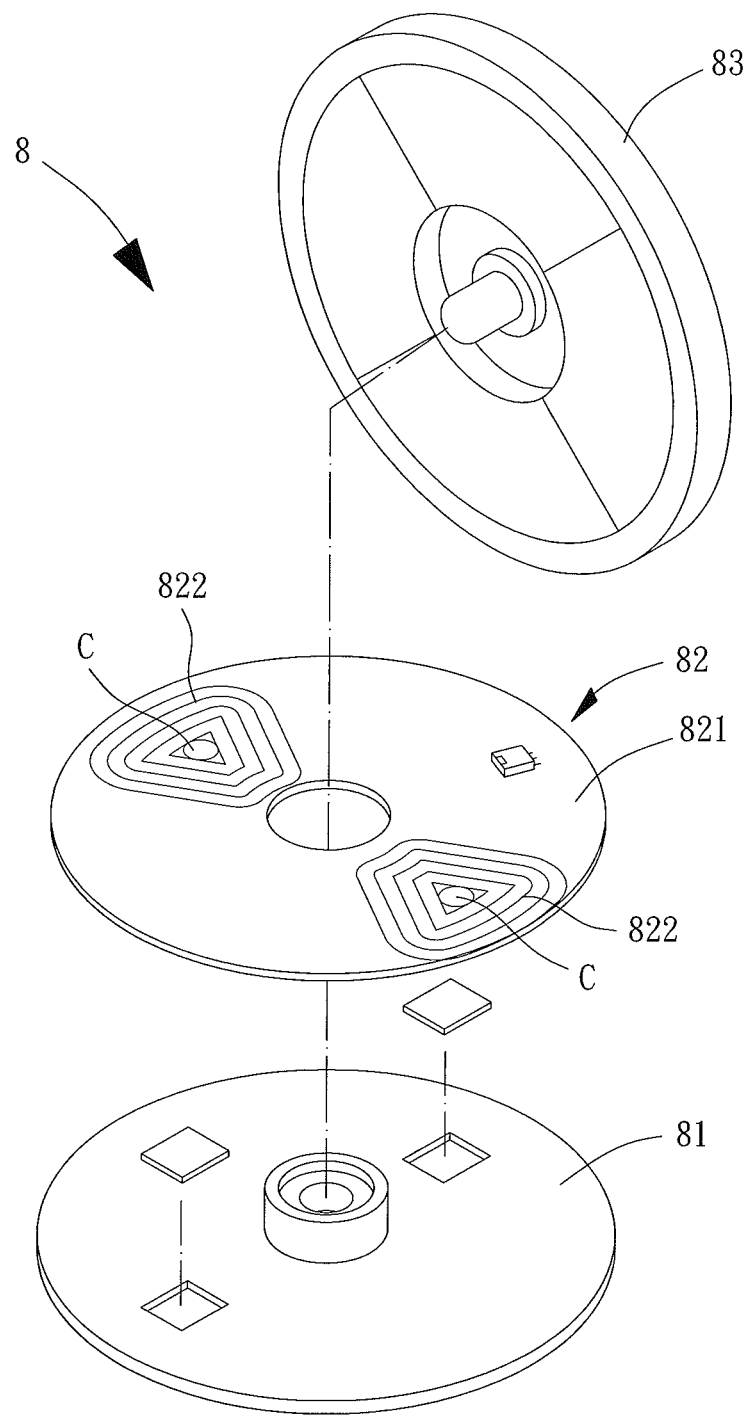
FIG. 1 is an exploded view of a conventional motor.
Figure 2:
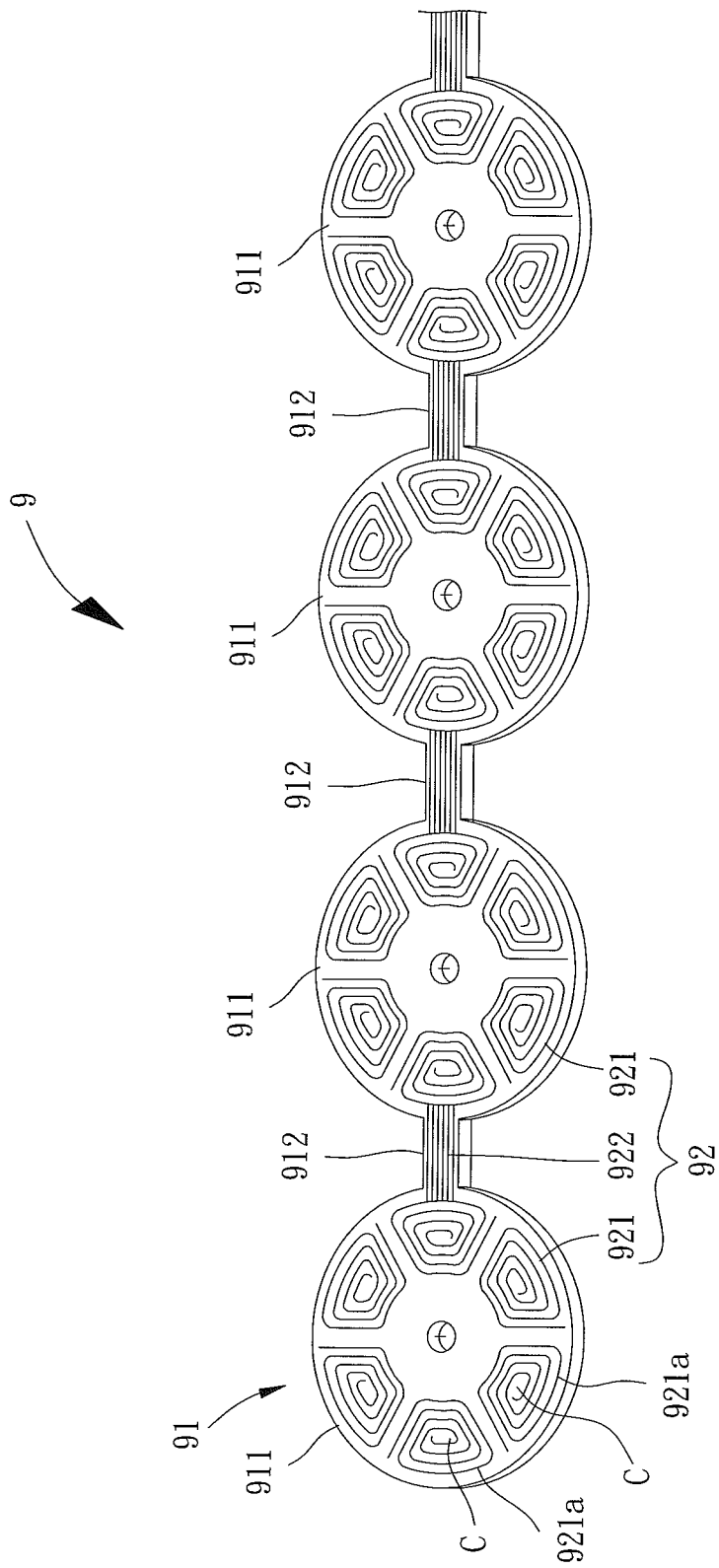
FIG. 2 shows a conventional motor winding structure.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 3:
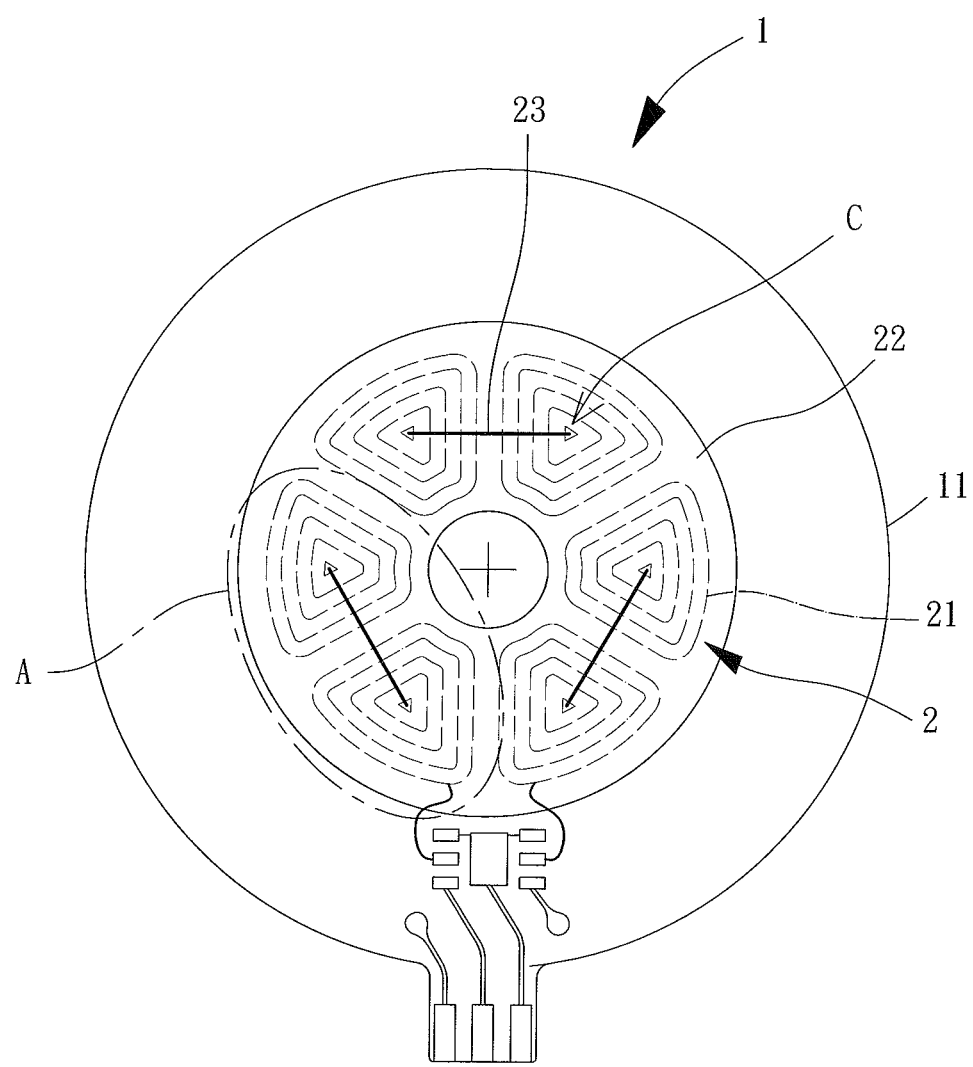
FIG. 3 shows a motor winding structure according to a first embodiment of the invention.

FIG. 3 shows a motor winding structure according to a first embodiment of the invention, which includes a base plate 1. The base plate 1 includes at least one board 11. Each board 11 is provided with a winding unit 2. The winding unit 2 may be arranged on the surface of the board 11.

The winding unit 2 may be arranged on the surface of the board 11 by electroforming or printing process. When the at least one board 11 includes a plurality of boards 11 (arranging from the $1^{st}$ to $n^{th}$ boards 11 in sequence), the motor winding structure also includes a plurality of winding units 2 arranged on the plurality of boards 11. Each board 11 is provided with a respective one of the winding units 2. Each winding unit 2 is comprised of a plurality of coils 21. The plurality of coils 21 may be arranged on the board 11 by electroforming or printing process.

Each coil 21 has an inner end adjacent to a center "C" of the coil 21, as well as an outer end distant to the center "C" of said coil 21. The inner end of the coil 21 is connected to the inner end of the other coil 21, or the outer end of the coil 21 is connected to the outer end of the other coil 21, thereby connecting the two coils 21 together. In the embodiment, the outer ends of two adjacent coils 21 can be electrically connected to each other by a conducting wire or by layout or welding, as it can be readily appreciated by one skilled in the art. Alternatively, referring to FIG. 3A which shows a cross sectional view of an area labeled as "A" in FIG. 3, the two adjacent coils 21 are connected to each other via the inner ends thereof.

Specifically, since the winding units 2 are arranged on the surfaces of the boards 11 by electroforming or layout, the inner ends of two adjacent coils 21 cannot be electrically connected to each other by the same electroforming or layout processes. In light of this, the winding unit 2 is configured to further include an insulating layer 22 and a conducting layer 23. Also, the inner end of each coil 21 is electrically connected to an electrical connection pad 211 for electrically connecting said inner end of the coil 21 to the inner end of the other coil 21. The coil(s) 21 that is connected to the conducting layer 23 is covered with the insulating layer 22. The conducting layer 23 extends through the insulating layer 22 to electrically connect to both the electrical connection pads 211 of the two adjacent coils 21. Thus, the two adjacent coils 21 can be electrically connected to each other via the inner ends, the electrical connection pads 211 and the conducting layer 23. Since the insulating layer 22 is arranged between the conducting layer 23 and the coils 21, short circuit between the conducting layer 23 and the coils 21 is prevented.

Figure 3A:
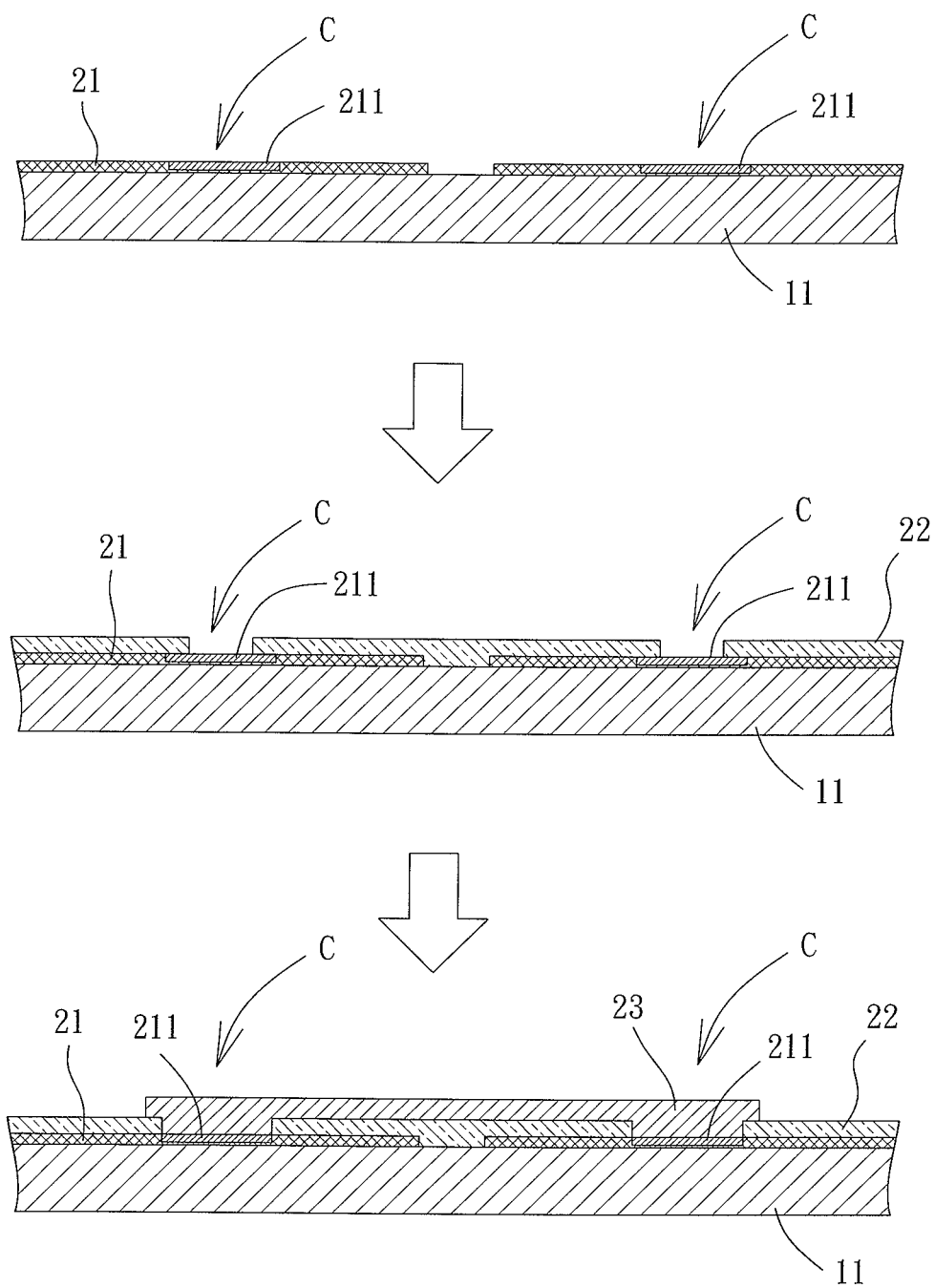
FIG. 3A which shows a cross sectional view of an area labeled as "A" in FIG. 3.

Referring to FIG. 3A also, during the production of the motor winding structure of the first embodiment of the invention, the electrical connection pad 211 is arranged on the center "C" of each of the two adjacent coils 21. Based on this, the inner end of each of the two adjacent coils 21 is electrically connected to the electrical connection pad 211. Then, the insulating layer 22 is arranged on the surface of the board 11 by micro-image process or coating process. The insulating layer 22 may be formed of an insulating material such as silicon dioxide, an insulating photoresist or a solder mask. The insulating layer 22 may be etched to form two recesses at the centers "C" of the two adjacent coils 21. Finally, metal or similar conducting material is used to form the conducting layer 23 on the insulating layer 22. The conducting layer 23 may be formed by printing process or distributing the metal or the conducting material on the insulating layer 22. The conducting layer 23 should be filled in the recesses of the insulating layer 22 at the centers "C" of the two adjacent coils 21. In this manner, the conducting layer 23 is able to penetrate the insulating layer 22 to electrically connect to the electrical connection pads 211 of the two adjacent coils 21.

Based on this, in the motor winding structure of the first embodiment of the invention, arrangement of the insulating layer 22 and the conducting layer 23 allows any two adjacent coils 21 of the winding unit 2 to be electrically connected to each other via the electrical connection pads 211. In other words, the coils 21 may be electrically connected to each other via the inner ends thereof, and can also be electrically connected to each other via the outer ends thereof. As such, the motor winding structure of the first embodiment of the invention allows the coils 21 of the winding unit 2 to be electrically connected to each other without having to form any conducting hole on the board 11. Advantageously, the production cost and structural complexity of the motor winding structure are reduced.

Figure 4:
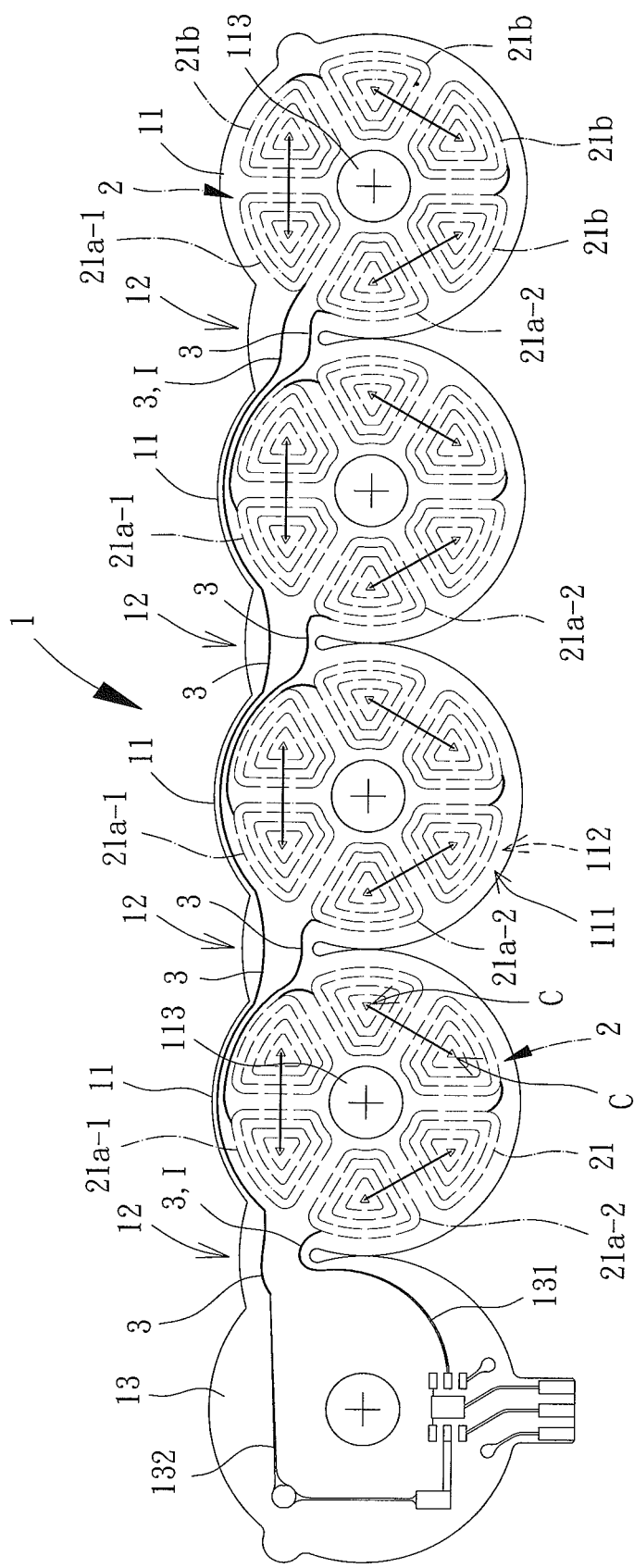
FIG. 4 shows a motor winding structure according to a second embodiment of the invention.

In the first embodiment of the invention above, the base plate 1 includes only one board 11. However, in the second embodiment of the invention as shown in FIG. 4, the base plate 1 includes a plurality of boards 11. Due to the arrangement of multiple boards 11, the base plate 1 may be a flexible print circuit board, a flexible plate or other similar foldable plates. After the base plate 1 is folded, the plurality of boards 11 can be stacked together to form a multi-layered winding structure. Besides, a bridge 12 is formed between two adjacent boards 11, so that the plurality of boards 11 can be connected in series. The shape of the bridge 12 is not limited.

Since each board 11 includes a winding unit 2, the motor winding structure has plural winding units 2. The winding units 2 are electrically connected to each other by a plurality of conducting wires 3. The conducting wires 3 are arranged on the base plate 1 and may extend through the boards 11 and the bridges 12. Therefore, the winding units 2 of the boards 11 are electrically connected to each other via the conducting wires 3.

Figure 6:
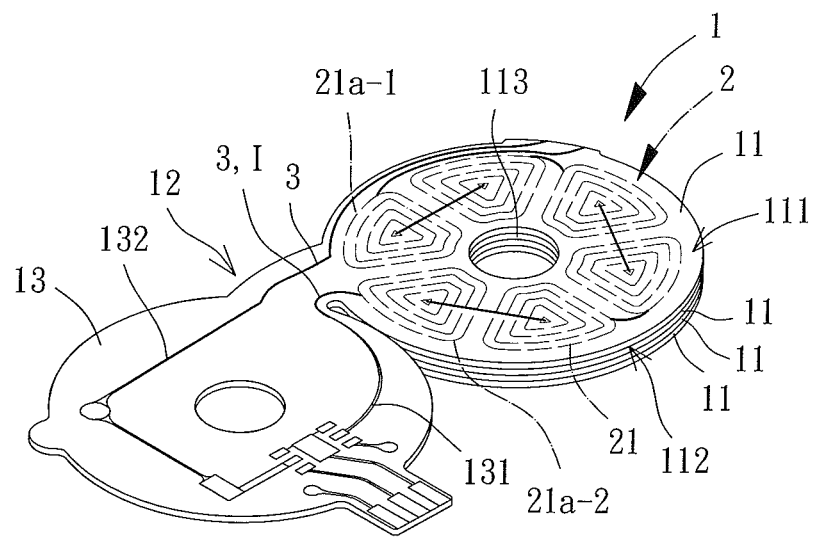
FIG. 6 shows the motor winding structure of the second embodiment of the invention after the folding process.

When the motor winding structure of the second embodiment is used in a motor, the base plate 1 can be folded at the bridges 12 to stack the plurality of boards 11 together, forming a multi-layered winding structure. The plurality of boards 11 may be fixed together by pressing or adhesion. Thus, as shown in FIG. 6, the coils 21 of the winding units 2 on the boards 11 are aligned with each other along an axial direction of the motor winding structure. Accordingly, the number of effective turns of the coils 21 is increased. Since the adjacent two coils 21 can be connected to each other via either inner ends or outer ends thereof, electrical connection between the winding units 2 can be achieved after the base plate 1 is folded without forming any conducting hole on the boards 11. Advantageously, the production cost and structural complexity of the motor winding structure are reduced.

Referring to FIG. 4 again, the winding unit 2 on each of the boards 11 is comprised of a plurality of coils 21. The plurality of coils 21 includes at least one first outer coil 21a-1 and at least one second outer coil 21a-2. The first and second outer coils 21a-1 and 21a-2 are electrically connected to the conducting wires 3. Thus, the first and second outer coils 21a-1 and 21a-2 are electrically connected to each other directly or indirectly, such that the first and second outer coils 21a-1 and 21a-2 are connected in series. As discussed before, since the adjacent two coils 21 can be electrically connected to each other via the inner ends or outer ends thereof, the first and second outer coils 21a-1 and 21a-2 can be connected in series directly. Alternatively, the winding unit 2 may further comprise at least one inner coil 21b. The first and second outer coils 21a-1 and 21a-2 and the inner coil(s) 21b may be circumferentially arranged on the surface of the board 11. The first outer coils 21a-1 is electrically connected to the second outer coil 21a-2 via the inner coil(s) 21b, forming a serial connection between the first and second outer coils 21a-1 and 21a-2 and the inner coil(s) 21b.

Specifically, the winding unit 2 in the embodiment includes four inner coils 21b. In this regard, the winding unit 2 is comprised of six coils 21. The first and second outer coils 21a-1 and 21a-2 and the four inner coils 21b are circumferentially arranged on the surface of the board 11. The four inner coils 21b are connected in series. The first outer coil 21a-1 can be electrically connected to one of the inner coils 21b adjacent to it, and the second outer coil 21a-2 can be electrically connected to another inner coil 21b adjacent to it. In this arrangement, the first outer coil 21a-1 can be electrically connected to the second outer coil 21a-2 via the four inner coils 21b, forming a serial connection between the first and second outer coils 21a-1 and 21a-2 and the four inner coils 21b.

Based on the above structure, the winding unit 2 on each of the boards 11 can be electrically connected to the winding unit 2 of the other board 11 via one conducting wire 3. In this embodiment, the winding units 2 of two adjacent boards 11 can be electrically connected to each other via one conducting wire 3. In other words, one end of the conducting wire 3 is connected to the first outer coil 21a-1 of one of the winding units 2, and another end of the conducting wire 3 is connected to the second outer coil 21a-2 of the other winding unit 2. As such, the winding units 2 of the two adjacent boards 11 can be electrically connected to each other. In this arrangement, the winding units 2 of the two adjacent boards 11 can be electrically connected to each other via one conducting wire 3. In this arrangement, the winding units 2 of the boards 11 are connected to each other in series. It can be known from the above description that, for any predetermined board 11 sandwiched between the left-sided and right-sided boards 11, the second outer coil 21a-2 of the winding unit 2 of the predetermined board 11 is connected to the winding unit 2 of the board 11 on the left side, and the first outer coil 21a-1 of the winding unit 2 of the predetermined board 11 is connected to the winding unit 2 of the board 11 on the right side. In this regard, the conducting wire 3 that is connected to the second outer coil 21a-2 of the winding unit 2 of the leftmost board 11 ($1^{st}$ board 11) is used as a power input terminal "I" which can be connected to a driving circuit. Similarly, the conducting wire 3 that is connected to the first outer coil 21a-1 of the winding unit 2 of the rightmost board 11 (the $n^{th}$ board 11) is used as another power input terminal "I" which can be connected to the driving circuit also. In other words, the two conducting wires 3 that are respectively connected to the winding units 2 of the first and $n^{th}$ boards 11 are used as the power input terminals "I" for electrically connecting to the driving circuit.

Figure 5:
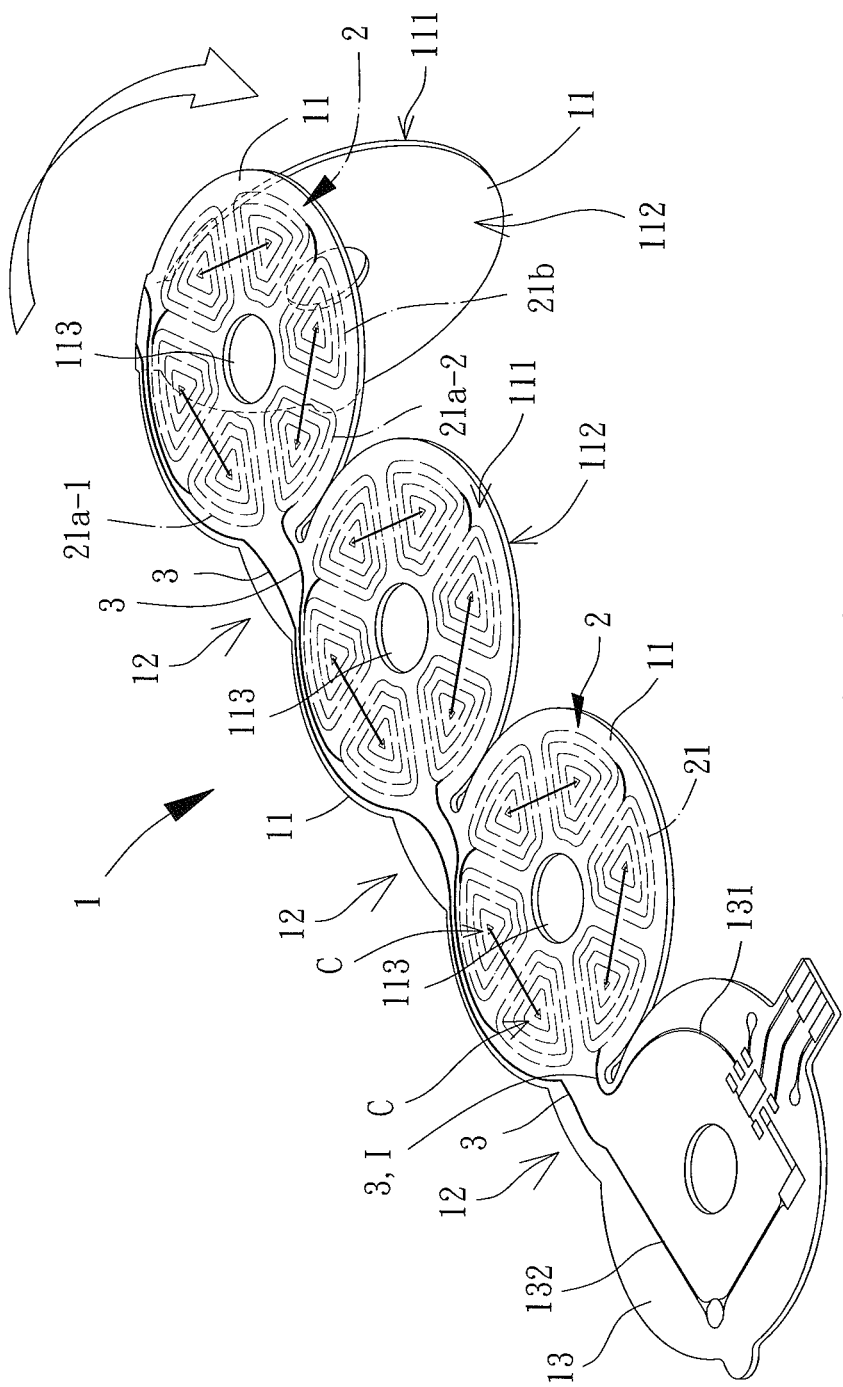
FIG. 5 shows a folding process of the motor winding structure of the second embodiment of the invention.

Referring to FIGS. 5 and 6, when the motor winding structure of the second embodiment is used in a motor, the base plate 1 can be folded at the bridges 12 to stack the plurality of boards 11 together, forming a multi-layered winding structure. The winding units 2 of the boards 11 are connected in series, and the first and second outer coils 21a-1 and 21a-2 and the inner coils 21b of each winding unit 2 are also connected in series. Thus, the power input terminals "I" that are connected to the outermost boards 11 (i.e. the top and bottom ones of the stacked boards 11) can be electrically connected to the driving circuit to form an electrical loop. As such, electricity can be supplied to the winding units 2 of the boards 11. After the winding units 2 of the boards 11 are electrified, the motor winding structure is able to drive a rotor of the motor to rotate. The principle on how the motor winding structure drives the rotor to rotate is not described herein as it can be readily appreciated by the skilled persons.

It can be known from the above that after the base plate 1 is folded, a driving circuit can be used to power all of the winding units 2 of the boards 11 without having to form any conducting hole on the boards 11.

It is noted that each of the boards 11 has a first face 111 and a second face 112 opposite to the first face 111. The winding unit 2 is preferably arranged on the first face 111. Namely, the second face 112 is not provided with the winding unit 2. The coils 21, the insulating layer 22 and the conducting layer 23 are arranged on the first face 111. Referring to FIGS. 3, 5 and 6, when folding the base plate 1 at the bridges 12, each board 11 is preferably folded towards the second face 112 of the adjacent board 11. This makes the coils 21 of the winding unit 2 of the board 11 face the second face 112 of the adjacent board 11. Based on this, since the second face 112 is not provided with the winding unit 2, the second face 112 is able to provide a desired insulating effect. This prevents the coils 21 or the conducting layer 23 of the board 11 from making contact with the coils 21 or the conducting layer 23 of the adjacent board 11. Thus, it is not necessary to provide an insulation mechanism between the boards 11.

Figure 7:
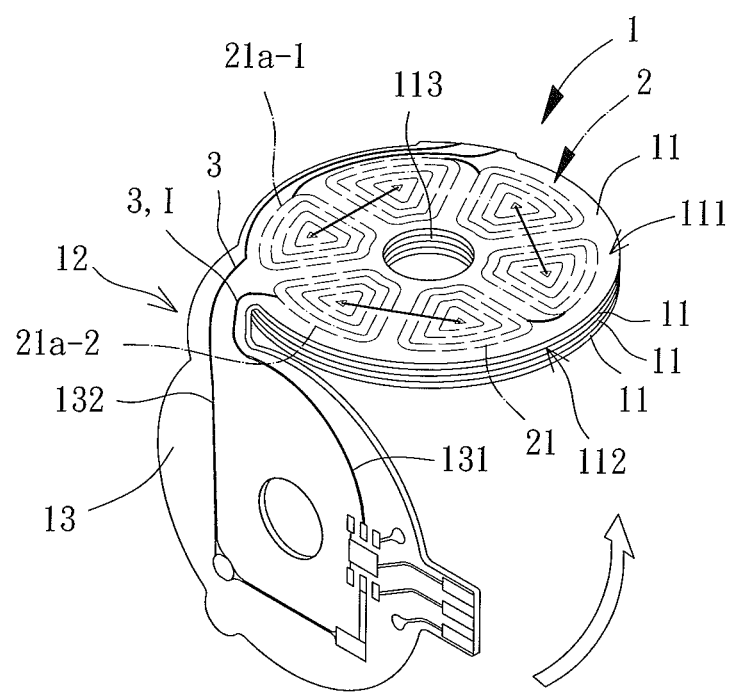
FIG. 7 shows the motor winding structure of the second embodiment of the invention where the driving circuit thereof is folded towards a multi-layered winding structure formed by the stacked boards.

Referring to FIGS. 4, 5 and 6, the base plate 1 may further include a driving circuit portion 13. The driving circuit portion 13 may be connected to the boards 11. A driving circuit is arranged on the driving circuit portion 13. In this regard, the driving circuit can be integrated with the winding units 2 to provide a convenient assembly. The driving circuit may include a first electrical wire 131 and a second electrical wire 132. The first and second electrical wires 131 and 132 may be connected to the two power input terminals "I," forming the driving circuit and the winding units 2 as an electrical loop. The connection of the driving circuit portion 13 is not limited. For example, the driving circuit portion 13 may be connected between two adjacent boards 11, or may be connected to the outermost board 11. After the boards 11 are folded to form the multi-layered winding structure, the driving circuit portion 13 may be the bottommost layer as shown in FIG. 7. Alternatively, the driving circuit portion 13 may be the topmost layer. Besides, when folding the base plate 1, the face of the driving circuit portion 13 that is not provided with the first and second electrical wires 131 and 132 preferably faces the board 11, so as to prevent the coils 21 or the conducting layer 23 of the board 11 from making contact with the first and second electrical wires 131 and 132 or other electronic components of the driving circuit portion 13.

Referring to FIGS. 4 and 6, an assembly hole 113 may be arranged at the center of each board 11. The assembly hole 113 extends through the first face 111 and the second face 112. When the boards 11 are folded to form the boards 11 as the multi-layered winding structure, the assembly holes 113 of the boards 11 may be aligned with each other along the axial direction of the motor winding structure. Arrangement of the assembly holes 113 allows the multi-layered winding structure to be fitted around a shaft tube of the motor, providing a reinforced coupling effect between the multi-layered winding structure and the motor.

Figure 8:
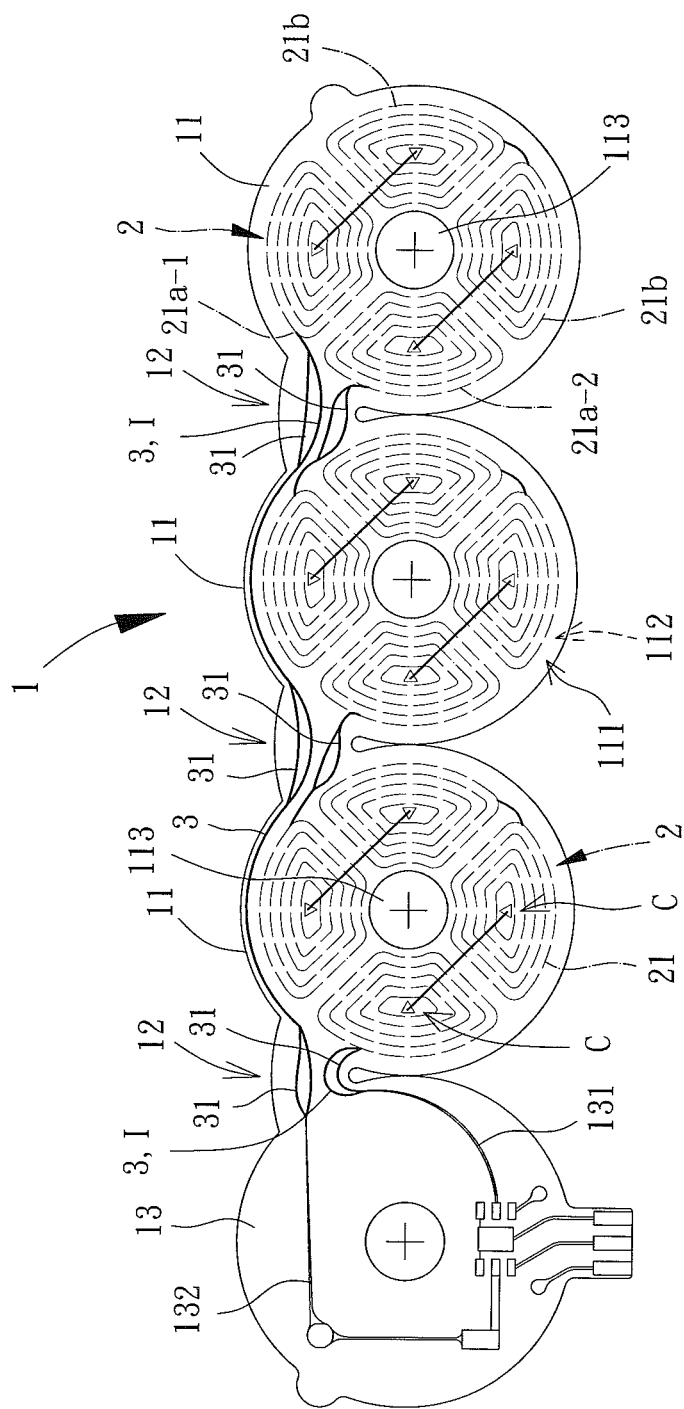
FIG. 8 shows another implementation of the motor winding structure of the second embodiment of the invention.

Referring to FIG. 8, another implementation of the motor winding structure of the second embodiment is shown. In the previous implementation, there are four boards 11. However, there may be only three boards 11 in this implementation. In other words, the number of the boards 11 is not limited in the invention. Furthermore, in the previous implementation, the winding unit 2 includes four inner coils 21b, and each winding unit 2 is comprised of six coils 21. However, in this implementation, the winding unit 2 includes only two inner coils 21b, and each winding unit 2 is comprised of only four coils 21. The number of the coils 21b is also not limited in the invention.

Referring to FIG. 8, the conducting wire 3 may have at least one part each being located on a respective bridge 12. Each part of the conducting wire 3 on the bridge 12 may be connected to at least one auxiliary conducing wire 31 in parallel. The auxiliary conducing wire 31 is provided to maintain the electrical connection between the winding units 2 when the conducting wire 3 breaks during the folding of the base plate 1. This improves the yield rate, the service life and safety of the motor winding structure.

Moreover, the conducting wire 3 and the auxiliary conducing wire 31 will be slightly lengthened by the process of folding the base plate 1. The increases in lengths of the conducting wire 3 and the auxiliary conducing wire 31 will result in slight increases in the impedances of the conducting wire 3 and the auxiliary conducing wire 31. In light of this, for the part of the conducting wire 3 located on the bridge 12, the diameter of said part of the conducting wire 3 and the diameter of the auxiliary conducing wire 31 are preferably larger than other part of the conducting wire 3 located on the board 11, so as to prevent deterioration in the conductibility of the conducting wire 3 and the auxiliary conducing wire 31 resulting from larger variations in the impedances of said wires 3 and 31. Thus, after the base plate 1 is folded at the bridges 12, the impedance changes of said part of the conducting wire 3 located on the bridge 12 as well as the auxiliary conducing wire 31 are smaller. Therefore, the conductibility of the conducting wire 3 and the auxiliary conducing wire 31 is not largely affected.

Figure 9:
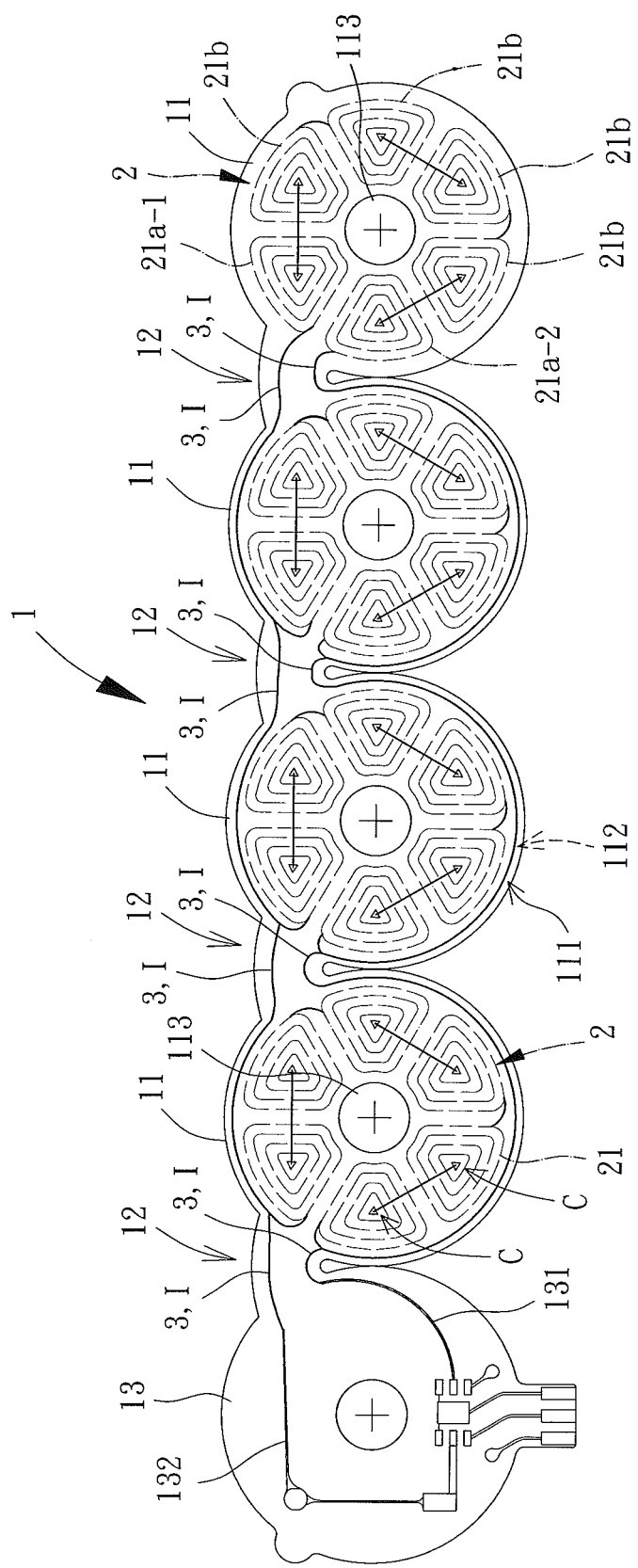
FIG. 9 shows a motor winding structure according to a third embodiment of the invention.

Referring to FIG. 9, a motor winding structure is shown according to a third embodiment of the invention. In this embodiment, the winding units 2 of the boards 11 are connected in parallel, as opposed to the serial connection of the winding units 2 discussed in the second embodiment above. Specifically, the conducting wire 3 that is connected to the first outer coils 21a-1 of all of the boards 11 is used as a power input terminal "I" for connecting to a first electrical wire 132 of the driving circuit. Similarly, the conducting wire 3 that is connected to the second outer coils 21a-2, of all of the boards 11 is used as another power input terminal "I" for connecting to a second electrical wire 131 of the driving circuit. Based on this, the winding units 2 of the boards 11 are connected in parallel.

Figure 10:
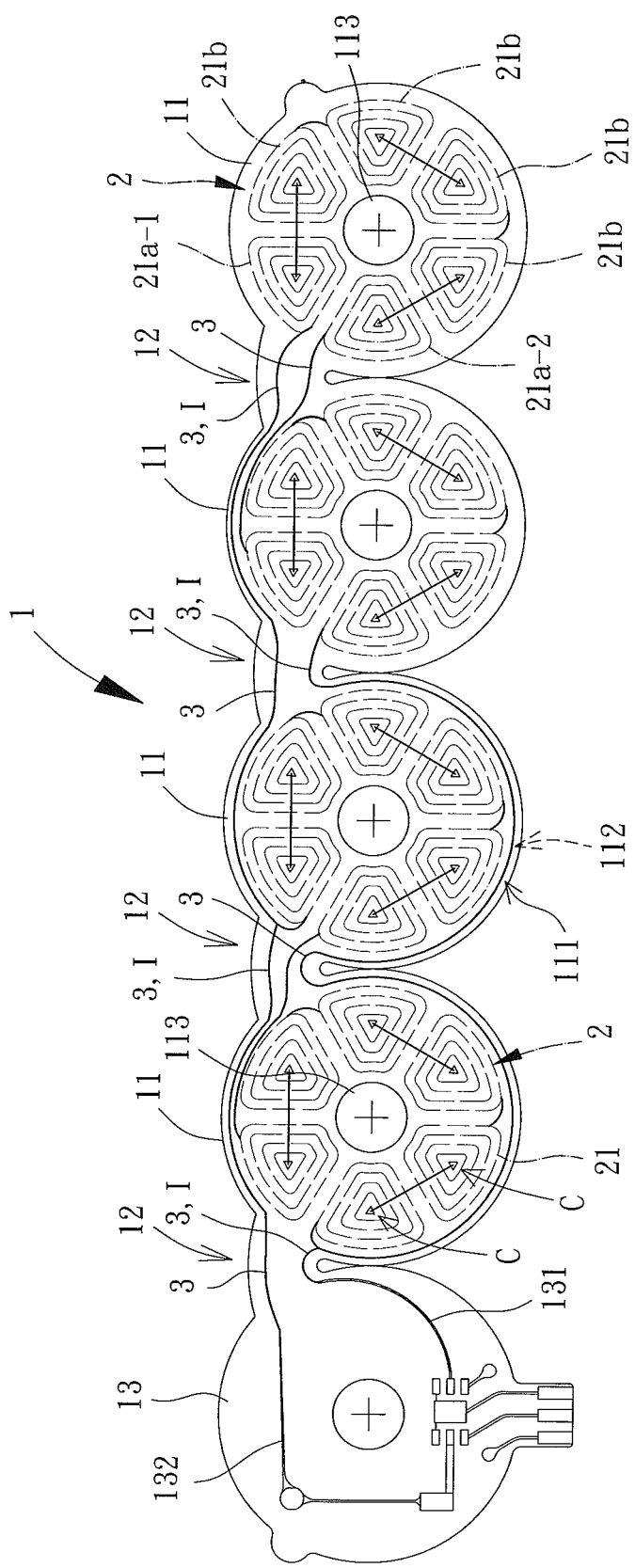
FIG. 10 shows a motor winding structure according to a fourth embodiment of the invention.

Referring to FIG. 10, a motor winding structure is shown according to a fourth embodiment of the invention. In this embodiment, the winding units 2 of the boards 11 are connected in parallel and series, as compared with the serial connection of the winding units 2 in the second embodiment and the parallel connection in the third embodiment. Specifically, the motor winding structure in the fourth embodiment may include a plurality of board units. Each board unit includes a plurality of boards 11. The winding units 2 of the boards 11 in an individual board unit are electrically connected in series as described in the first embodiment. In this regard, two conducting wires 3 are connected to the board unit and are used as power input terminals "I." The board units can be electrically connected to each other in parallel by connecting the power input terminals "I" of each of the board units to the first and second electrical wires 131 and 132, respectively. For example, the motor winding structure in FIG. 10 includes two board units. The left two boards 11 are electrically connected in series and form one board unit, and the right two boards are also electrically connected in series and form the other board unit. The two board units are electrically connected in parallel. In this manner, all of the winding units 2 of the boards 11 can be connected in series and parallel.

Figure 11:
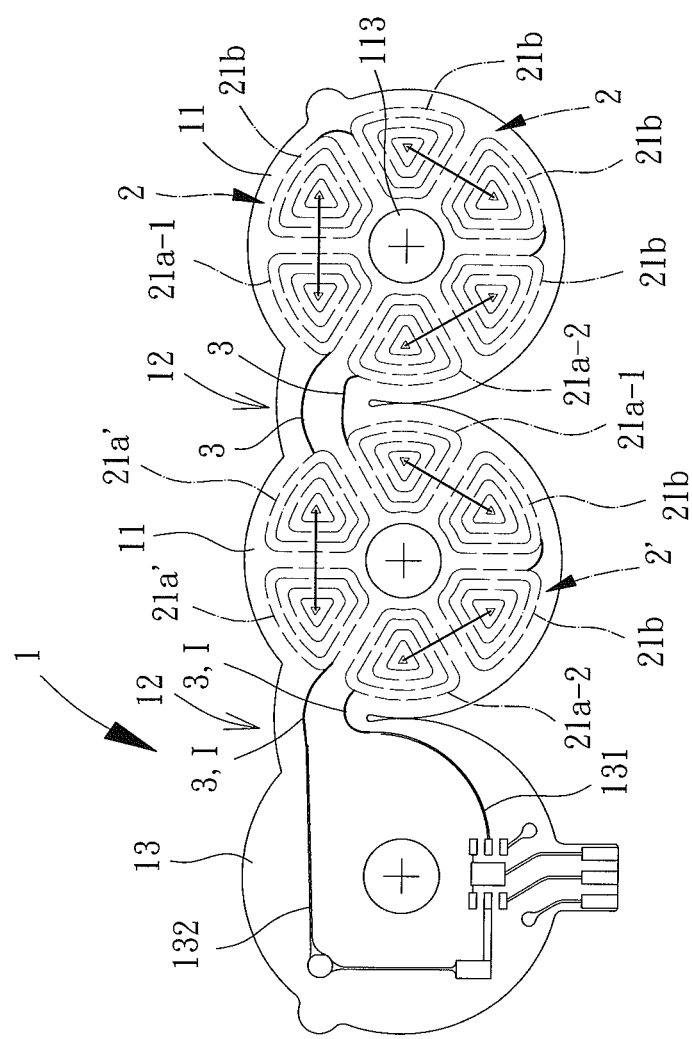
FIG. 11 shows a motor winding structure according to a fifth embodiment of the invention.

Referring to FIG. 4, when the winding units 2 of the boards 11 are connected in series in the second embodiment, the winding units 2 of the two outermost boards 11 (the $1^{st}$ and $n^{th}$ boards 11) are connected to two conducting wires 3, respectively. Disadvantageously, the conducting wire 3 that is connected to the most distant board 11 ($n^{th}$ board 11) must extend all the way through all of the boards 11 and the bridges 12 to connect to the second electrical wire 132. In light of this, FIG. 11 shows a motor winding structure according to a fifth embodiment of the invention. The motor winding structure in this embodiment includes two boards 11 adjacent to each other. The winding units 2 and 2' of the two boards 11 are connected in series. The fifth embodiment differs from the second embodiment in that, in addition to the first and second outer coils 21a-1 and 21a-2, the winding unit 2' of one of the two boards 11 further includes two serial-connected coils 21a'. In this regard, for the winding unit 2', the first and second outer coils 21a-1 and 21a-2 and the two serial-connected coils 21a' are circumferentially arranged on the board 11. Similar to the coils 21a', the first and second outer coils 21a-1 and 21a-2 are also connected in series. Besides, the first and second outer coils 21a-1 and 21a-2 are connected to two conducting wires 3, respectively. Based on this, the first outer coil 21a-1 of the winding unit 2' may be connected to the second outer coil 21a-2 of the winding unit 2 via another conducting wire 3, and one of the two serial-connected coils 21a' of the winding unit 2' may be connected to the first outer coil 21a-1 of the winding unit 2 via the a further conducting wire 3. As such, the coils 21 of the winding unit 2' and 2 can be connected in series. Then, the conducting wire 3 that is connected to the second outer coil 21a-2 of the winding unit 2' is used as a power input terminal "I," and the conducting wire 3 that is connected to another serial-connected coil 21a' of the winding unit 2' is used as another power input terminal "I." In this arrangement, the motor winding structure in the fifth embodiment allows the two power input terminals "I" to connect to the winding unit 2' of the same board 11. This effectively simplifies the routing of the conducting wires 3 when connecting the driving circuit with the power input terminals "I." This also prevents the potential damage to the base plate 1 resulting from the conducting wire 3 extending through the entire base plate 1 including all of the boards 11 and the bridges 12. Similar to the second embodiment, at least one inner coil 21b may be arranged between the first and second outer coils 21a-1 and 21a-2. Therefore, the first and second outer coils 21a-1 and 21a-2 and the inner coil(s) 21b may be connected in series. Similarly, at least one inner coil 21b may be circumferentially arranged with the two serial-connected coils 21a', such that the two serial-connected coils 21a' and the inner coil(s) 21b are connected in series.

In conclusion, in each of the embodiments above, the winding unit 2 of each board 11 is comprised of a plurality of coils 21, and any two adjacent coils 21 may be connected to each other via the inner ends or outer ends thereof without having to form any conducting hole on the boards 11. As compared with the conventional motor 8 and the conventional motor winding structure 9 where the production cost and structural complexity are high due to the arrangement of the conducting holes on the board 821 and the boards 911, the motor winding structure in each of the embodiments has lower cost and complexity. Besides, when there are more than one board 11, the coils 21 include at least one first outer coil 21a-1 and at least one second outer coil 21a-2 that are electrically connected to each other directly or indirectly. Thus, the first and second outer coils 21a-1 and 21a-2 are connected in series. In this regard, after the base plate 1 is folded, the winding units 2 of the boards 11 can be electrically connected to each other without having to form any conducting hole on the boards 11. As such, a driving circuit can be provided to power the winding units 2 of the boards 11.

As stated above, in each embodiment of the invention, since it is not required to form any conducting hole on the boards 11 of the motor winding structure, short circuit of the winding units 2 between two adjacent boards 11 can be prevented. Thus, the insulation treatment between the boards 911 of the conventional motor winding structure 9 is not needed in the invention, thereby simplifying the production procedure of the motor winding structure of the invention. Furthermore, each of the boards 11 has a first face 111 and a second face 112 opposite to the first face 111. In this regard, when the winding units 2 are arranged on the first faces 111 of the boards 11, each board 11 can be folded towards the second face 112 of the adjacent board 11. In this arrangement, all of the coils 21 of the winding unit 2 on each board 11 are able to remain exposed or face the second face 112 of the adjacent board 11. In this regard, since the second face 112 of each board 11 is insulating, insulation treatment between the boards 11 is not required. As compared with the conventional motor winding structure 9 where the insulation treatment between the boards 911 is required, the motor winding structure in each embodiment of the invention has a simplified production procedure.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor winding structure comprising a base plate (1) comprising a board (11) having a winding unit (2), wherein the winding unit (2) comprises a plurality of coils (21) formed on a surface of the board (11) by electroforming or layout, wherein each of the plurality of coils (21) has a center (C), wherein each of the plurality of coils (21) comprises an inner end adjacent to the center (C) thereof, as well as an outer end distant to the center (C) thereof, wherein two adjacent coils (21) of the winding unit (2) are connected to each other via the inner ends thereof, wherein the winding unit (2) further comprises an insulating layer (22) and a conducting layer (23), wherein the inner end of each of the two adjacent coils (21) is connected to an electrical connection pad (211), wherein the insulating layer (22) is arranged on the surface of the board (11), wherein the two adjacent coils (21) are covered by the insulating layer (22), wherein the conducting layer (23) extends through the insulating layer (22) and is electrically connected to the electrical connection pads (211) of the two adjacent coils (21), and wherein the two adjacent coils (21) are electrically connected to each other via the inner ends thereof.

2. The motor winding structure as claimed in claim 1, wherein the insulating layer (22) is formed by silicon dioxide, an insulating photoresist or a solder mask, wherein the conducting layer (23) is in a form of a metal formed on the insulating layer (22), wherein the insulating layer (22) is etched to form two recesses at the centers (C) of the two adjacent coils (21), wherein the conducting layer (23) is filled in the recesses of the insulating layer (22) and is electrically connected to the electrical connection pads (211) of the two adjacent coils (21).

3. A motor winding structure comprising a base plate (1) comprising a plurality of boards (11) including a first board (11) to a $n^{th}$ board (11) connected in sequence, wherein each of the plurality of boards (11) has a winding unit (2), wherein the winding unit (2) comprises a plurality of coils (21) formed on a surface of the board (11) by electroforming or layout, wherein each of the plurality of coils (21) has a center (C), wherein each of the plurality of coils (21) comprises an inner end adjacent to the center (C) thereof, as well as an outer end distant to the center (C) thereof, wherein two adjacent coils (21) of the winding unit (2) are connected to each other via the inner ends thereof, wherein the winding unit (2) further comprises an insulating layer (22) and a conducting layer (23), wherein the inner end of each of the two adjacent coils (21) is connected to an electrical connection pad (211), wherein the insulating layer (22) is arranged on the surface of the board (11), wherein the two adjacent coils (21) are covered by the insulating layer (22), wherein the conducting layer (23) extends through the insulating layer (22) and is electrically connected to the electrical connection pads (211) of the two adjacent coils (21), and wherein the two adjacent coils (21) are electrically connected to each other via the inner ends thereof.

4. The motor winding structure as claimed in claim 3, wherein the base plate (1) is foldable.

5. The motor winding structure as claimed in claim 4, wherein a bridge (12) is formed between two adjacent boards (11), wherein the winding units (2) of the plurality of boards (11) are connected to each other via a plurality of conducting wires (3), and wherein the plurality of conducting wires (3) is arranged on the base plate (1) and extends through the plurality of boards (11) and the bridges (12).

6. The motor winding structure as claimed in claim 5, wherein the plurality of conducting wires (3) comprises a first conducting wire (3) and a second conducting wire (3), wherein the plurality of coils (21) of each of the plurality of boards (11) comprises a first outer coil (21a-1) and a second outer coil (21a-2) connected in series, wherein the first and second outer coils (21a-1, 21a-2) of one of the plurality of boards (11) are connected to the first and second conducting wires (3), respectively.

7. The motor winding structure as claimed in claim 6, wherein the plurality of coils (21) of the winding unit (2) further comprises at least one inner coil (21b) connected between the first and second outer coils (21a-1, 21a-2), and wherein the first and second outer coils (21a-1, 21a-2) and the at least one inner coil (21b) are connected to each other in series and are circumferentially arranged on the surface of the board (11).

8. The motor winding structure as claimed in claim 6, wherein the winding units (2) of the plurality of boards (11) are connected to each other in series.

9. The motor winding structure as claimed in claim 8, wherein the winding units (2) of the two adjacent boards (11) are connected to each other via the first or second conducting wire (3), and wherein the first or second conducting wire (3) that is connected between the winding units (2) of the two adjacent boards (11) comprises an end electrically connected to the first outer coil (21a-1) of one of the winding units (2), as well as another end electrically connected to the second outer coil (21a-2) of another one of the winding units (2).

10. The motor winding structure as claimed in claim 9, wherein the first and second conducting wires (3) are connected to the first and $n^{th}$ boards (11) respectively, wherein the plurality of conducting wires (3) further comprises a third conducting wire (3) connected to the first board (11) only, wherein the first and third conducting wires (3) are used as power input terminals, and wherein the power input terminals are adapted to be connected to a driving circuit.

11. The motor winding structure as claimed in claim 8, wherein the plurality of boards (11) includes first and second boards (11), wherein the plurality of coils (21) of the first board (11) further comprises two serial-connected coils (21a'), wherein the first outer coil (21a-1) of the first board (11) is electrically connected to the second outer coil (21a-2) of the second board (11) via the first conducting wire (3), wherein one of the two serial-connected coils (21a') of the first board (11) is electrically connected to the first outer coil (21a-1) of the second board (11) via the second conducting wires (3), and wherein the plurality of conducting wires (3) further comprises a third conducting wire (3) connected to the second outer coil (21a-2) of the first board (11), as well as a fourth conducting wire (3) connected to another one of the two serial-connected coils (21a') of the first board (11).

12. The motor winding structure as claimed in claim 11, wherein the third and fourth conducting wires (3) are used as two power input terminals that are adapted to be connected to a driving circuit.

13. The motor winding structure as claimed in claim 6, wherein the winding units (2) of the plurality of boards (11) are connected in parallel.

14. The motor winding structure as claimed in claim 13, wherein the first conducting wire (3) is connected to the first outer coils (21a-1) of the plurality of boards (11) and is used as a power input terminal, wherein the second conducting wire (3) is connected to the second outer coils (21a-2) of the plurality of boards (11) and is used as another power input terminal, and wherein the two power input terminals are adapted to be connected to first and second electrical wires (131, 132) of a driving circuit, respectively.

15. The motor winding structure as claimed in claim 5, wherein each of the plurality of conducting wires (3) has a part that is located on the bridge (12), and wherein said part of the conducting wire (3) is connected to an auxiliary conducing wire (31) in parallel.

16. The motor winding structure as claimed in claim 15, wherein said part of the conducting wire (3) or the auxiliary conducing wire (31) has a diameter larger than another part of the conducting wire (3) located on the board (11).

17. The motor winding structure as claimed in claim 5, wherein an assembly hole (113) is arranged at a center of each of the plurality of boards (11).

18. The motor winding structure as claimed in claim 5, wherein each of the plurality of boards (11) comprises a first face (111) and a second face (112) opposite to the first face (111), and wherein the winding unit (2) is arranged on the first face (111).

19. The motor winding structure as claimed in claim 18, wherein the base plate (1) is folded at the bridges (12) in a manner that each of the plurality of boards (11) other than the first board (11) is folded towards the second face (112) of an adjacent one of the plurality of boards (11).

20. The motor winding structure as claimed in claim 19, wherein the base plate (1) further comprises a driving circuit portion (13) electrically connected to the plurality of boards (11).

21. A motor winding structure comprising a foldable base plate (1) having a plurality of board units, wherein each of the plurality of board units comprises the plurality of boards (11) as claimed in claim 5, wherein the winding units (2) in each of the plurality of board units are electrically connected in series, and wherein the plurality of board units is electrically connected to each other in parallel.

* * * * *